UNITED STATES PATENT OFFICE.

ARZA T. LYON, OF CINCINNATI, OHIO, ASSIGNOR TO THE INDESTRUCTIBLE BUILDING MATERIAL COMPANY OF OHIO.

IMPROVEMENT IN COMPOSITIONS FOR BUILDING PURPOSES.

Specification forming part of Letters Patent No. 164,850, dated June 22, 1875: application filed June 17, 1875.

*To all whom it may concern:*

Be it known that I, ARZA T. LYON, of Cincinnati, in the county of Hamilton and State of Ohio, have invented certain new and useful Improvements in Composition for Building Purposes, of which the following is a specification:

This invention relates to a new and improved composition of matter for building purposes, being designed particularly for the manufacture of artificial building-blocks, as a substitute for natural stone; also as a substitute for the ordinary mortar for plastering walls, and for the construction of water and fire proof floors and partitions for houses, and a variety of other similar purposes.

The invention consists in a compound composed of asbestus, hydraulic cement, coal-ashes, lime, and sulphate of lime, or plaster-of-paris, mixed with water to bring it to the consistency of mortar; the mass, after being properly molded or spread and properly dried, being saturated with silicate of soda, or water-glass, as more fully hereinafter set forth.

In preparing the improved compound, the ingredients are prepared and mixed in the following proportions, viz: coarsely-ground asbestus, twenty-two pounds; Portland or other hydraulic cement, twenty-two pounds; coal-ashes, twenty-two pounds; air-slaked lime, twenty-two pounds; and calcined sulphate of lime, or plaster-of-paris, thirty pounds.

These ingredients are mixed and thoroughly incorporated with sufficient water to bring the mass to the consistency of ordinary plasterer's mortar, in which condition the compound is ready to be molded or applied to walls, ceilings, or floors, in the same manner as ordinary plaster or concrete, or to be formed into building-blocks in suitable molds. In either case, after application, or after being formed into blocks, the compound is left to dry for about one week, when it is saturated with soluble silicate of soda or potash, commonly known as water-glass, after which it is again allowed to dry.

In the manufacture of building-blocks, the mass, as above prepared, is molded in suitable forms, and allowed to dry for about one week. The blocks thus formed are then immersed in a bath of the soluble silicate of soda or potash, for about five days, or until thoroughly saturated, after which they are removed and dried, when they are ready for use.

When the compound is to be applied to ceilings, walls, or floors, it is spread thereon in the manner well known to plasterers or manufacturers of concrete pavements, and, after properly setting or drying, is washed or floated with the soluble silicate, until thoroughly saturated with the same, after which it is allowed to dry, eventually becoming as hard as stone.

Having thus fully described my invention, what I claim, and desire to secure by Letters Patent, is—

The composition of matter for building purposes, consisting of asbestus, hydraulic cement, coal-ashes, air-slaked lime, and plaster-of-paris, about in the proportions specified, and thoroughly mixed and incorporated with water, and molded or applied as specified, and saturated with soluble silicate of soda or potash, substantially as described.

In testimony that I claim the foregoing, I have hereunto set my hand in the presence of the subscribing witnesses.

ARZA T. LYON.

Witnesses:
A. W. WATERS,
B. F. HOLLISTER.